(12) United States Patent
Cranfill et al.

(10) Patent No.: US 7,421,088 B2
(45) Date of Patent: Sep. 2, 2008

(54) MULTIFUNCTION TRANSDUCER

(75) Inventors: David B. Cranfill, Sparta, NJ (US);
David S. Brenner, Arlington Heights, IL (US); Michael E. Caine, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 595 days.

(21) Appl. No.: 10/650,643

(22) Filed: Aug. 28, 2003

(65) Prior Publication Data

US 2005/0047621 A1   Mar. 3, 2005

(51) Int. Cl.
*H04R 25/00* (2006.01)

(52) U.S. Cl. .................. 381/386; 381/190; 381/396

(58) Field of Classification Search ......... 381/162–163, 381/182, 184–186, 190–191, 386, 396
See application file for complete search history.

(56) References Cited

U.S. PATENT DOCUMENTS

| | | | | |
|---|---|---|---|---|
| 5,646,589 | A * | 7/1997 | Murray et al. | 340/7.58 |
| 7,106,878 | B2 * | 9/2006 | Saiki et al. | 381/182 |
| 2003/0044031 | A1 * | 3/2003 | Son | 381/182 |
| 2004/0252857 | A1 * | 12/2004 | Lewis | 381/355 |

* cited by examiner

*Primary Examiner*—Suhan Ni
(74) *Attorney, Agent, or Firm*—Randall S. Vaas

(57) ABSTRACT

Multi-function transducers (130, 700) that are suitable for use in handheld devices such as cellular telephones (100, 900) and are capable of emitting audio, and generating accelerations of sufficient magnitude, and at frequencies that can be sensed by tactile sensation and which exhibit resonant modes that are characterized by center frequencies within a frequency range that can be sensed by tactile sensation, and specifically located between two musical notes on a musical scale are provided. Devices (100, 900) including such transducer are provided, and methods of operating such transducers are provided.

6 Claims, 9 Drawing Sheets

MULTIFUNCTION TRANSDUCER

FIELD OF THE INVENTION

The present invention relates in general to portable electronic devices. More particularly, the present invention relates to audio and tactile user interface aspects of portable electronic devices.

BACKGROUND OF THE INVENTION

Portable electronic devices and in particular wireless communication devices have achieved a high level of market penetration. Cellular phones are a ubiquitous sight in today's societies. People have generally become highly accustomed to using cellular telephones. Presently there is an interest in enhancing the functionality and user experience in using portable electronic apparatus such as wireless communication devices, such as cellular telephones. To that end various steps toward making cellular telephones multimedia capable, such as the introduction of color screens, adding electronic cameras, and enhancing wireless network bandwidth, have been undertaken.

It is expected that the delivery and experiencing of multimedia content will become an increasingly important part of users' total experience in using portable electronic devices such as cellular telephones, and an important focus of telecommunication related industries that support the use of cellular telephones. It is expected that third party companies other than network service providers will be involved in producing and distributing multimedia content intended for multimedia capable portable electronic devices such as cellular telephones. If as anticipated, a myriad of third parties, are producing content for multimedia capable devices, it may not be possible to rigorously scrutinize such content for full compatibility with devices onto which it is loaded and subsequently output. Unfortunately, this raises the possibility that some incompatibility in some media types may cause certain portable devices to operate unpredictably.

On another note, user's have come to expect portable electronic devices such as cellular telephones to be relatively small. The small size is presents a design constraint that must be faced in considering the enhancement of multimedia functionality. One area where the size constraint has been a limitation is audio. Typically, in order to reproduce high fidelity audio, in particular audio including a strong bass component relatively large speakers are used. This is not an option if an audio system is to be included in a small (e.g., handheld) portable electronic devices, such as a multimedia capable cellular telephone.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
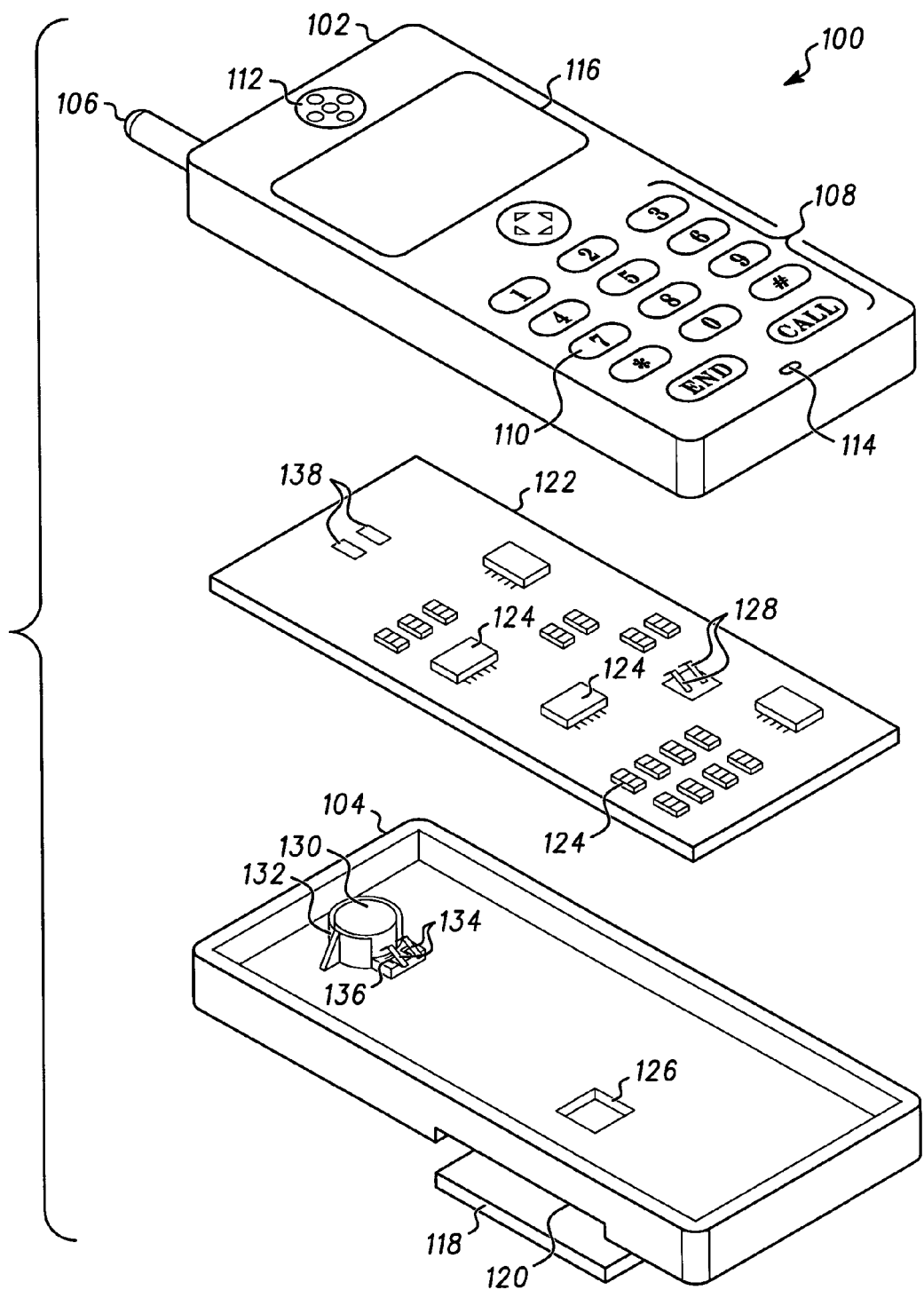
FIG. 1 is an exploded view of a cellular telephone according to a first embodiment of the invention.

FIG. 1 is an exploded view of a cellular telephone 100 according to a first embodiment of the invention. The cellular telephone 100 comprises, a front housing part 102, and a rear housing part 104. The front housing part 102 supports and antenna 106 and includes an array of openings 108 that accommodate keys of a keypad 110. A speaker grill 112 and a microphone grill 114 are also provided on the front housing part 102. A display opening 116 is also including in the front housing part 102. A battery compartment cover 118 is provided for covering a battery compartment 120 in the rear housing part 104.

The front 102, and rear 104 housing parts enclose a circuit board 122. In FIG. 1 the back side of the circuit board 122 is visible. A plurality of electrical circuit components 124, that make up one or more electrical circuits of the cellular telephone 100 are mounted on the circuit board 122. Circuits of the cellular telephone 100 are more fully described below with reference to a functional block diagram shown in FIG. 6. The front side of the circuit board 122 (not shown), supports a display, and includes a plurality of pairs of open contacts, that are selectively bridged by conductive pads attached to keys of the keypad 110. An opening 126 from inside the rear housing part 104 into the battery compartment 120, provides access for spring loaded contacts 128 that are mounted on the circuit board 122, and make contact with contacts on a battery (not shown) held in the compartment 120.

A multi-function transducer (MFT) 130 is mounted in a semi-cylindrical sleeve 132 that is integrally molded inside the back housing part 104. A pair of spring contacts 134 are coupled (e.g., by soldering) to terminals of the 136 of the MFT 130. When the cellular telephone 100 is assembled the spring contacts 134 make contact with a pair of contact terminals 138 on the circuit board 122. The MFT 130 is capable of emitting sound and also vibrating at frequencies, and at a power level that can be felt by a person holding the cellular telephone 100. The MFT 130 is also capable of generating a non-periodic impulse e.g., in response to a step function signal, of sufficient magnitude to be felt. The MFT 130 is used to output multimedia content including audio and vibration signals that are derived from a variety of sources including standard MIDI files, specifically tailored MIDI files, and compressed audio format files e.g., .WAV, .MP3 files.

Figure 2:
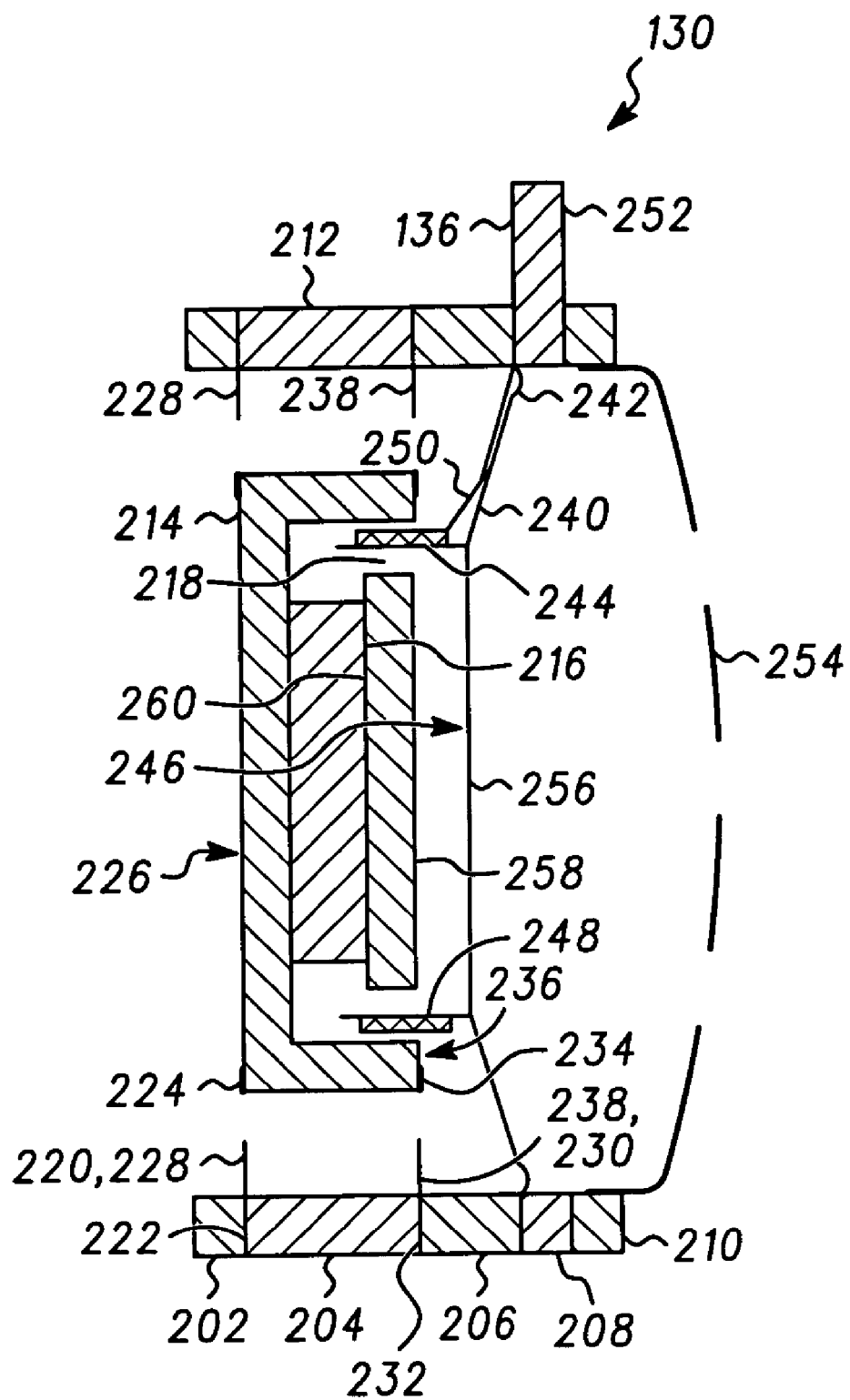
FIG. 2 is a cross sectional view of a multi-functional transducer used in the cellular telephone shown in FIG. 1.
Figure 3:
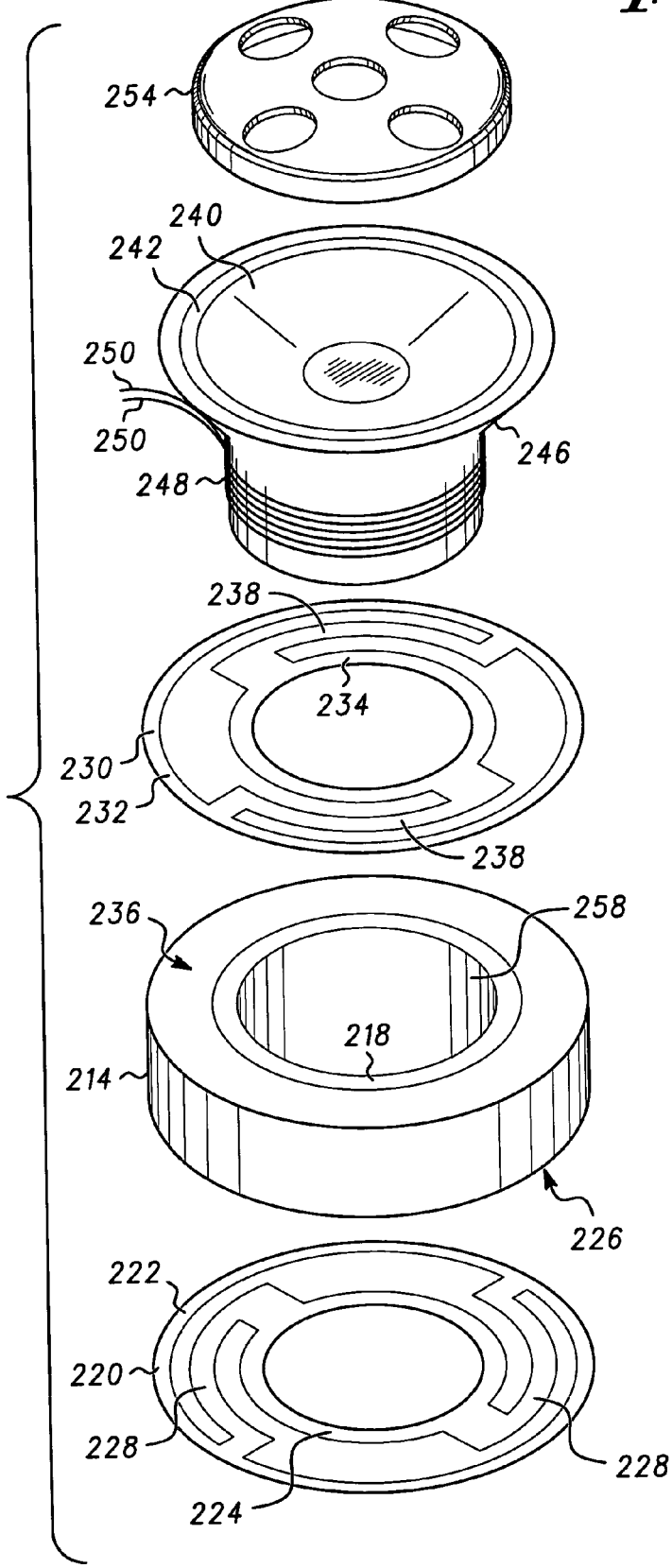
FIG. 3 is an exploded view of internal parts of the multi-functional transducer shown in FIG. 2.

FIG. 2 is a cross sectional view of the MFT 130 used in the cellular telephone 100 shown in FIG. 1, and FIG. 3 is an exploded view of internal parts of the MFT 130. A plurality of rings including a first ring 202, a second ring, 204, a third ring 206, a fourth ring 208, and a fifth ring 210 are bonded together to form a housing 212 of the MFT 130. The five rings 202, 210 secure various other components of the MFT 130 as will be described. A cup shaped ferromagnetic back plate 214 is located concentrically within the housing 212. A magnet 216 is bonded to and located concentrically within the cup shaped ferromagnetic back plate 214. A ferromagnetic pole piece 258 is bonded to the magnet 216. An outside diameter of the pole piece smaller than an inside diameter of the cup shaped back plate 214 so that there is an annular gap 218 between the cup shaped back plate 214, and pole piece 258. A magnetic field that comprises a strong radial component crosses the annular gap 218. The outside diameter of the pole piece 258 is larger than an outside diameter of the magnet 216 helping to direct the magnetic field radially in the annular gap 218.

A first spiral arm leaf spring 220 includes an outer ring 222 that is secured between the first 202, and second 204 rings of the housing 212, an inner ring 224 that is fixed (e.g., by spot welding) to a back surface 226 of the cup shaped back plate 214, and two spiral spring arms 228 that extend between the outer ring 222 and the inner ring 224. Similarly, a second spiral arm leaf spring 230 includes an outer ring 232 that is secured between the second 204, and third 206 rings of the housing 212, an inner ring 234 that is fixed (e.g., by spot welding) to a front surface 236 of the cup shaped back plate 214, and two spiral spring arms 238 that extend between the outer ring 232 and the inner ring 234. The magnet 216, pole piece 258, and back plate 214 make up a magnetic assembly 260. The magnetic assembly 260 is biased to a resting position by the first 220, and second 230 spiral arm leaf springs, which serve as a resilient support.

A speaker cone 240 is located concentrically in the housing 212. A speaker cone suspension 242 that is peripherally coupled to the speaker cone 240 is fixed between the third housing ring 206 and the fourth housing ring 208. The speaker cone suspension 242 is flexible to allow for axial movement of the speaker cone 240 in the housing 212. A cylindrical sleeve 244 is attached to a back surface 246 of the speaker cone 240. The cylindrical sleeve 244 is located in the annular gap 218. A voice coil solenoid 248 is wound on the cylindrical sleeve 244. Leads 250 of the voice coil solenoid 246 extend radially along the back surface 246 of the speaker cone 240, between the third 206 and fourth 208 housing rings and out to the terminals 136 of the MFT that are located on a radial extension 252 of the fourth housing ring 208. A perforated cover 254 is located in front of the speaker cone 240, and is secured (e.g., by press fitting) to the fifth housing ring 210. The speaker cone 240 comprises a front surface 256, which together with the back surface 246 serve to excite sound waves in a surrounding acoustic medium (e.g., air), when the speaker cone is caused to oscillate.

In operation broadband oscillating signals including audio signals, and vibration signals, that are applied to the leads 250 of the voice coil solenoid 248 produce commensurate currents in the voice coil solenoid 248. Owing to the fact that the voice coil solenoid 248 is immersed the magnetic field crossing the annular gap 218, the currents flowing in the voice coil result in commensurate Lorentz forces between the voice coil solenoid 250, and the magnetic assembly 260. At any given instant the Lorentz force urges the speaker cone 240, and the magnetic assembly 260 in opposite directions. In so far as oscillating signals are applied to voice coil solenoid the Lorentz forces are oscillatory and therefore induce the voice coil solenoid 250, and the magnetic assembly 260 to oscillate. The voice coil solenoid 250 serves as a transducer motor, that is to say an element that converts electrical signals to mechanical forces and motion, in the MFT 130.

The magnetic assembly 260, supported by the spiral arm leaf springs 220, 230, constitutes a first mechanical resonator that exhibits a first resonance characterized by a center frequency and a Quality (Q) factor. The center frequency of the first mechanical resonator can be adjusted by altering the total mass of the magnetic assembly 260 and by altering the resiliency of the spiral arm leaf springs 220, 230 using the formula for the resonant frequency of a simple harmonic oscillator (SHO) given in equation 1, as a guide.

$$Fo = \frac{1}{2\pi}\sqrt{\frac{k}{m}} \text{ where,} \qquad \text{EQU. 1}$$

$k$ is the spring constant of the SHO; and $m$ is the mass of the SHO.

The center frequency of the first resonance is advantageously between 120 and 180 Hz. Frequencies in the aforementioned range have been found to be useful in exciting vibrations that can be felt by users holding, or otherwise mechanically coupled to the cellular telephone 100. More particularly the center frequency of the first resonance can be advantageously between about 140 and 160 Hz. Frequencies in the latter range have been found to be particularly efficacious. Furthermore, the center frequency of the first resonance can be approximately centered between two adjacent musical notes on a musical scale, preferably a western musical scale. More particularly, the center frequency of the first resonance can be spaced by no more than 10% of a frequency distance between the two adjacent musical notes, from the average frequency of the two adjacent musical notes. The dimensions of the components of MFT 130 and particularly the mass magnetic assembly 260 are chosen in the interest of generating sufficient vibration force to generate tactile sensation when mounted in cellular telephone 100.

A high Q factor is obtained by using low loss spiral arm leaf springs 220, 230. The spiral arm leaf springs 220, 230 can be made from high hardness spring steel. The Q factor can be advantageously made sufficiently high, that in view of the location of the center frequency between two adjacent musical notes, the relative response at the two adjacent musical notes is at least 6 dB below that of the relative response at the center frequency. More advantageously, the relative response of the first resonator, at the two adjacent musical notes can be 7.5-10 dB lower than the response at the center frequency.

The speaker cone 240 supported by the speaker cone suspension 242 forms a second resonator. The second resonator exhibits a second resonance that is characterized by a center frequency that is higher that the center frequency of the first resonance. However, the resonance of the second resonator is highly damped by excitation of the sound waves by the speaker cone 240, and thus the speaker cone 240, voice coil solenoid 248 system is able to operate effectively over a broad range of frequencies, to generate sound waves.

When a signal that includes frequency components corresponding to the first resonance, and other, audio frequency components is applied to the leads 250, both the magnetic assembly 260 and the speaker cone 240 will be driven to oscillate simultaneously. However due to first resonance, if the amplitude of frequency components corresponding to the first resonance, were of an amplitude that typically might be found in music or other audio having bass notes, the amplitude of excursions of the magnetic assembly 260 would be so high as to cause undesirable mechanical noises, and/or to result in distortion of sound generated by the speaker cone 240. However, by selecting the center frequency, and Q of the first resonance as described above, the amplitude of excitation of the first resonance by musical notes that might perchance be included in a signal applied to the MFT 130 is reduced, reducing the distortion of sound generated by the MFT 130, and at least substantially reducing the generation of undesirable mechanical noises. The first resonance of the MFT 130 can be advantageously excited by signal components of predetermined, limited amplitude characterized by frequencies at or near the center frequency of the first resonance that are intentionally included in a driving signal applied to the MFT 130.

Figure 4:
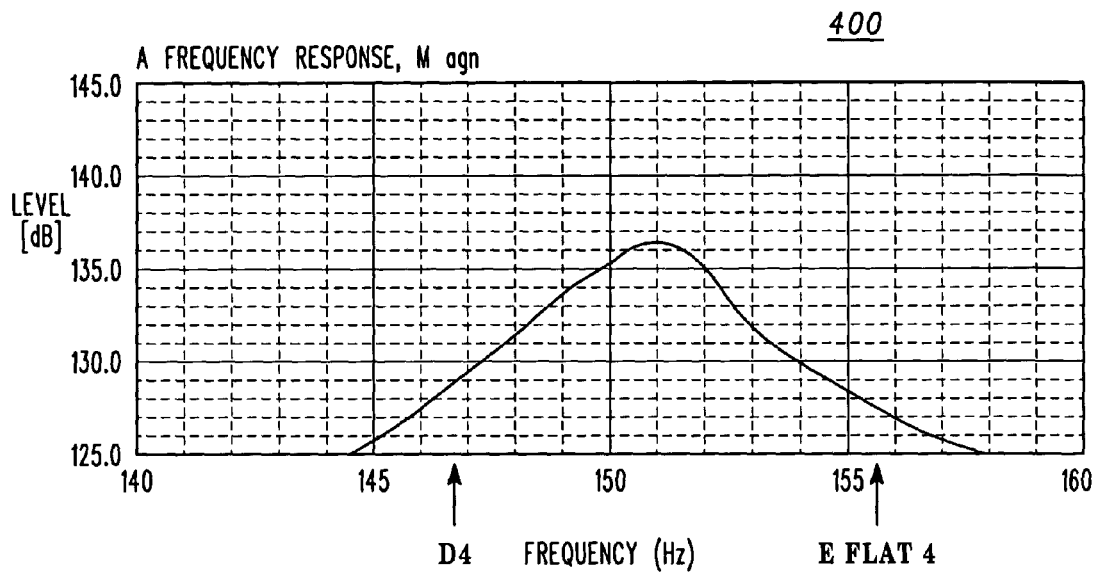
FIG. 4 is a vibration frequency response graph of the multi-frequency transducer shown in FIGS. 2-3.

FIG. 4 is a vibration frequency response graph 400 of the multi-frequency transducer shown in FIGS. 2-3. The graph 400 illustrates the vibration response of the MFT 130 in the vicinity of the above mentioned first resonance. The abscissa is marked off in Hertz, and the ordinate is marked off in decibels, with 0 db corresponding to an acceleration of 1 micrometer/second$^2$. As shown on the graph 400 the first resonance is characterized by a center frequency of 151 Hz. The center frequency at 151 Hz is located between the D4 note which is located at 146.83 Hz and the E flat 4 musical note which located at 155.56 Hz. The locations of the D4 and E flat 4 notes are noted on the graph 400. The frequency difference between D4 and E flat 4 is 8.73 Hz. The average of the frequencies of the D4 and E flat 4 is 151.195 Hz. The difference between the center frequency of the first resonance at 151 Hz and the average of the two notes is therefore 0.195 Hz. Thus, in this case the center frequency of the first resonance at 150 Hz is spaced from the average frequency of the two adjacent notes at D4 and E flat 4 151.95 Hz by about 2% of the difference between the frequencies of the two adjacent notes 8.73 Hz.

As shown in FIG. 4, the vibration response at the center frequency of the first resonance, at 151 Hz, is 136.4 decibels (equivalent to 0.67 g), the frequency response at the D4 note at 146.83 Hz is 128.7 decibels (equivalent to 0.28 g), and the frequency response at the E flat 4 note at 155.56 Hz is 127.5 decibels (equivalent to 0.24 g). Thus, the frequency response at the D4 note is 7.7 dB lower than the frequency response at the center frequency of the first resonance, and the frequency response at the E flat 4 note is 8.9 dB lower than the response at the center frequency of the first resonance.

Figure 5:
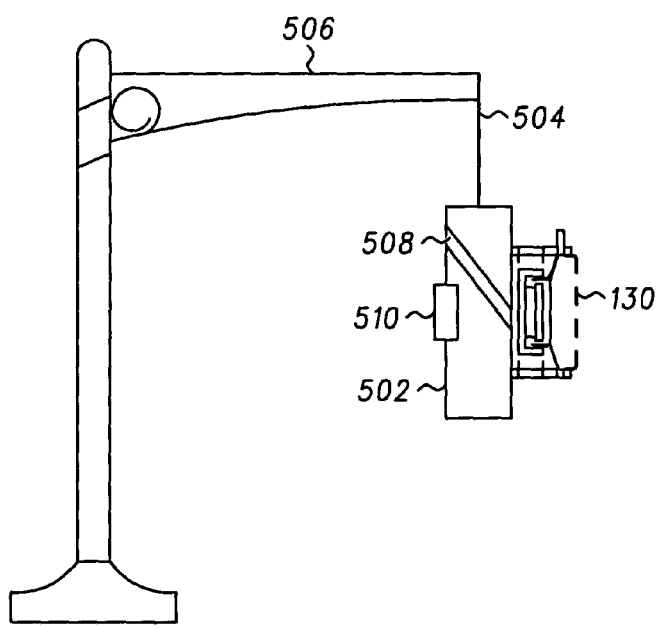
FIG. 5 is a schematic representation of testing apparatus used to measure the frequency response shown in FIG. 4.

FIG. 5 is a schematic representation of testing apparatus used to measure the frequency response shown in FIG. 4. The testing apparatus comprises a test mass 502, suspended by a wire 504 from a support stand 506. The MFT 130 is attached to the test mass 502 such that the axis of motion of the parts of the MFT 130 (e.g., magnetic assembly 260, and speaker cone 240) is perpendicular to the wire 504. A vent hole 508 that extends from behind the MFT 130 through the test mass 502 out to the atmosphere prevents the development of back pressure behind the MFT 130. An accelerometer 510 is attached to the test mass 502 opposite the MFT 130. The accelerometer 510 is oriented so as to measure acceleration along the axis of motion of the parts of the MFT 130. Test leads (not shown) are attached to the MFT 130 for applying a swept frequency signal, and test leads (not shown) are attached to the accelerometer 510 for collecting accelerometer data. The test leads should be arranged to hang freely while conducting tests on the MFT 130. In obtaining the data shown in FIG. 4, a test mass 502 that weighed 100 grams was used with a 50 centimeter wire 504.

Figure 6:
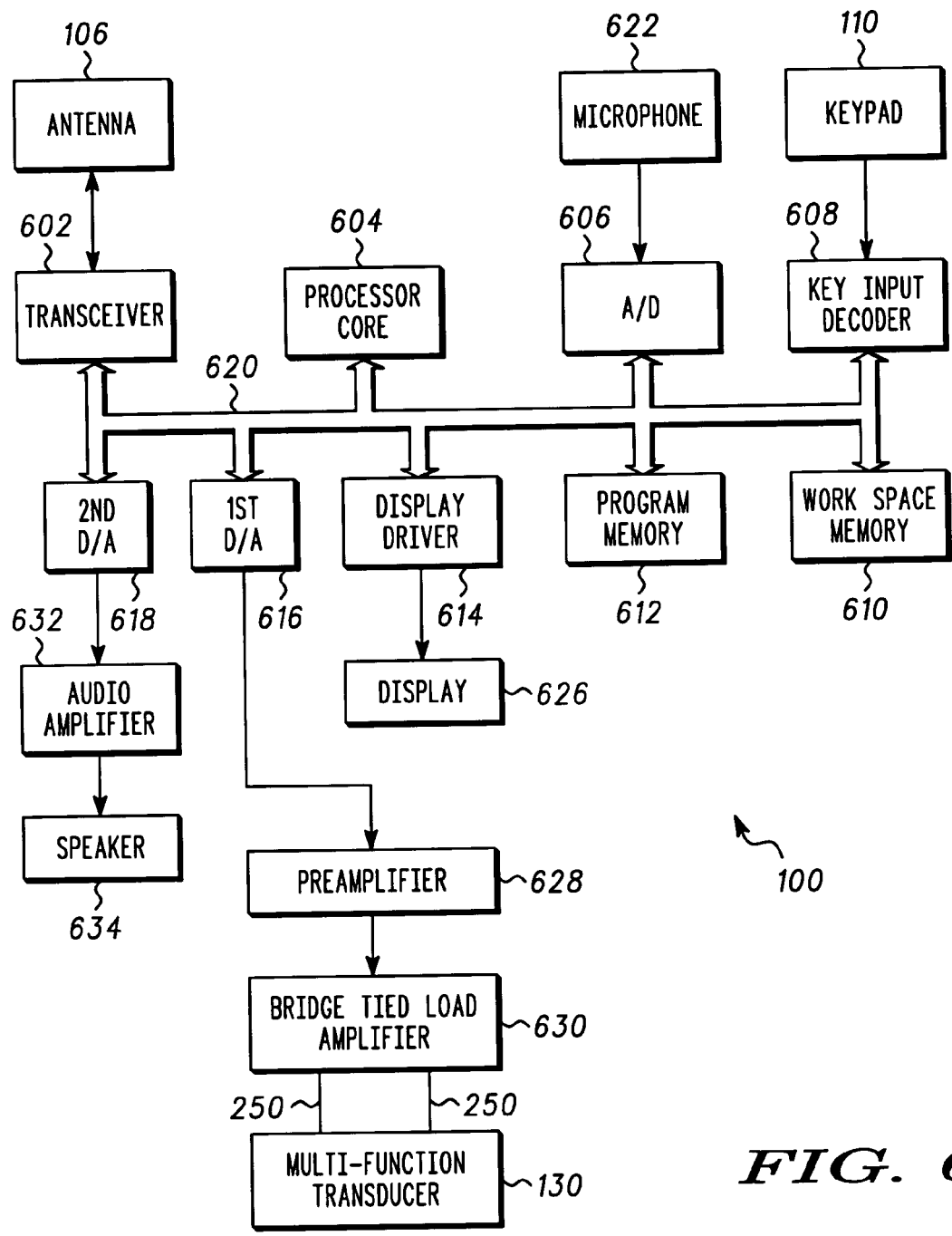
FIG. 6 is a functional block diagram of the cellular telephone shown in FIG. 1.

FIG. 6 is a functional block diagram of the cellular telephone 100 shown in FIG. 1. As shown in FIG. 6, the cellular telephone 100 comprises a transceiver module 602, a processor core 604, an analog to digital converter (A/D) 606, a key input decoder 608, a work space memory 610, a program memory 612, a display driver 614, a first digital to analog converter (D/A) 616, and a second D/A 618 coupled together through a digital signal bus 620.

The transceiver module 602 is coupled to the antenna 106. Carrier signals that are modulated with data, e.g., digitally encoded signals for driving the MFT or digitally encoded voice audio, pass between the antenna 106, and the transceiver 602.

A microphone 622 is coupled to the A/D 606. Audio, including spoken words, is input through the microphone 208 and converted to a stream of digital samples by the A/D 606.

The keypad 110 is coupled to the key input decoder 608. The key input decoder 608 serves to identify depressed keys, and provide information identifying each depressed key to the processor core 604. The display driver 614 is coupled to a display 626.

The first D/A 616 is coupled through a preamplifier 628, and a bridge tied load amplifier (BTL) 630 to the leads 250 of the MFT 130. The BTL amplifier 630 provides a bipolar drive signal for the MFT 130. Optionally the preamplifier 628 is provided with a gain setting input that is coupled to the processor core 604 through the signal bus 620. The first D/A 616 converts pulse code modulation (PCM) digital signal samples to analog drive signals that are amplified by the preamplifier 628 the and BTL amplifier 630 and drive the MFT 130.

The second D/A 618 is coupled through an audio amplifier 632 to a speaker 632. The second D/A 612 converts decoded digital audio to analog signals and drives the speaker 632. The audio amplifier 632 may comprises a plurality of amplifiers.

One or more programs for processing data structures that include digitally encoded signals for driving the MFT 130 are stored in the program memory 612, and executed by the processor core 604. Programs for processing such data structures are described below in more detail with reference to FIGS. 10-11. PCM digital signal samples that result from such processing are applied to the first D/A 616 in order to drive the MFT 130. Data structures that include digitally encoded drive signals for the MFT 130 are optionally preprogrammed into the program memory 612, or received through the transceiver 602.

The program memory 612 is also used to store programs that control other aspects of the operation of the cellular telephone 602. The program memory 612 is a form of computer readable medium.

The transceiver module 602, the processor core 604, the A/D 606, the key input decoder 608, the work space memory 610, the program memory 612, the display driver 614, the first D/A 616, the second D/A 618, the preamplifier 628, the BTL amplifier 630, the audio amplifier 632, and the digital signal bus 620, are embodied in the electrical circuit components 124 and in interconnections of the circuit board 122 shown in FIG. 1.

Figure 7:
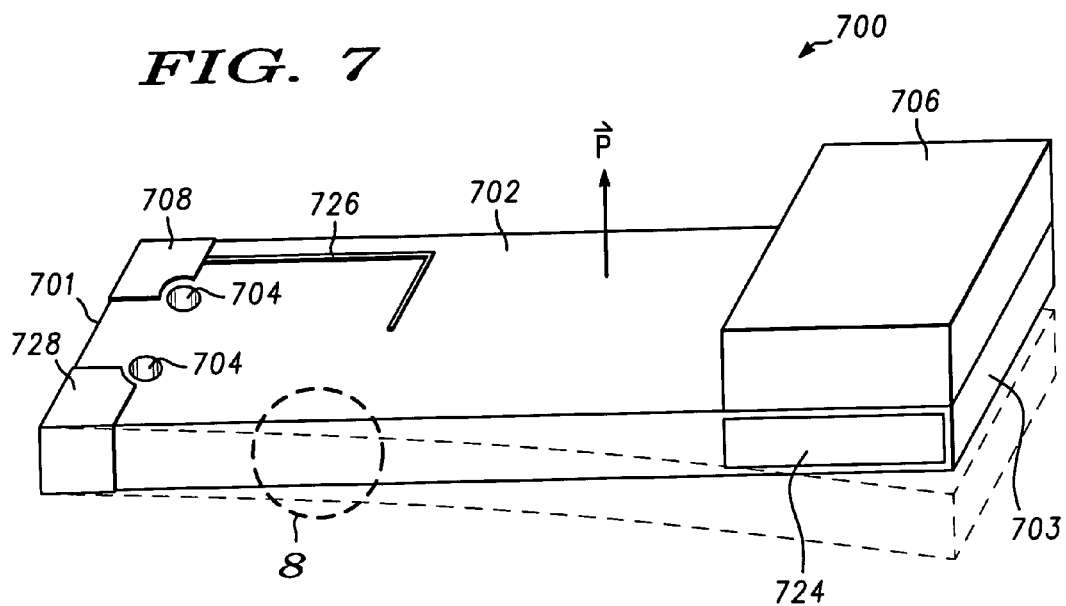
FIG. 7 is a perspective view of a multi-function transducer according to a second embodiment of the invention.
Figure 8:
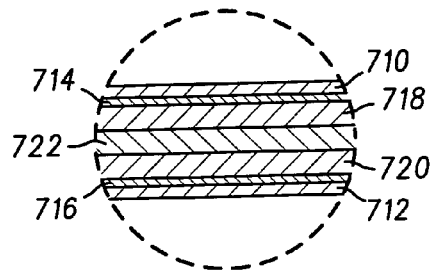
FIG. 8 is a magnified view of a portion of the multi-function transducer shown in FIG. 7.

FIG. 7 is a perspective view of a MFT 700 according to a second embodiment of the invention and FIG. 8 is a magnified view of a portion of the MFT shown in FIG. 7. The MFT 700 includes a flat beam piezoelectric transducer motor 702. A first end 701 of the flat beam 702 is provided with two through holes 704 that are used to mount the MFT 700. A mass 706 is supported at a second end 703 of the beam 702. The second end 703 of the beam 702 is free to move. A first electrical contact 708, and a second electrical contact 728 are located proximate the first end 701 of the beam 702. A twisted pair leads 218 (not shown in FIG. 7) are soldered to the first and second contacts 708, 728. Other types of electrical connections can be used in lieu of the twisted pair of leads.

The beam 702 includes a plurality of layers as will be described presently. A first outer mylar layer 710 forms one side of the beam 702, and a second outer mylar layer 712 forms an opposite side of the beam 702. A first silver film layer 714, and a second silver film layer 716 are located between the first and second mylar layers 710, 712. A first piezoelectric layer 718 and a second piezoelectric layer 720 are located between the first and second silver film layers 714, 716. A spring steel shim 722 is located between the first and second piezoelectric layers 718, 720. The recited layers are bonded together using heat cured epoxy. The recited layered structure can extend over a middle portion of the beam 702. The layered structure need not extend under the mass 706 or to the first end 701. A metal plate 724 can be located between the first and second outer mylar layers 710, 712 underneath the mass 706. The first and second piezoelectric layers 718, 720 are advantageously polarized parallel to each other and perpendicular to the top and bottom major surfaces of the beam 702. A possible polarization direction is indicated by a vector labeled P. The first and second silver film layers 714, 716 are electrically connected to the first electrical contact 708 by a first metallization trace 726, and a second metallization trace (not shown) that run between the outer mylar layers 710, 712 and the silver film layers 714, 716. Such metallization traces 726 can be deposited on the outer mylar layers 710, 712. The spring steel shim 722 is electrically connected to the second electrical contact 728. The spring steel shim 722 along with the first and second silver film layers 714, 716 serve as planar electrodes for applying electric fields to the piezoelectric layers 718, 720.

If the first electrical contact 708 is coupled to a first pole of a DC signal source, and the second electrical contact 728 is connected to a second pole of the DC signal source, oppositely directed electric fields will be established in the first and second piezoelectric layers 718, 720. Such oppositely directed fields will induce one of the piezoelectric layers 718, 720 to expand, and the other of the piezoelectric layers 718, 720 to contract. The simultaneous expansion of one of the piezoelectric layers 718, 720 and contraction of the other of the piezoelectric layers 718, 720, will cause the beam 702 to bow, and the mass 706 to be displaced perpendicularly with respect to the length of the beam 702. A somewhat exaggerated depiction of the deflected beam 702, without the mass 702, is shown by shadow lines. If the polarity of the signal source coupled to the first and second electrical contacts 708, 710 is reversed, the beam 702 will deflect in an opposite sense. By applying bipolar oscillating signals to the MFT 700, the MFT 700 is caused vibrate. The mass 706 is used to set a resonance of the MFT 700 at a frequency that is suitable for generating perceptible vibrations. By driving the MFT 700 with a signal that is close to or equal to a resonant frequency of the MFT 700, the MFT 700 will be caused to vibrate at a sufficient amplitude that the vibrations are perceptible to a user carrying the cellular telephone 106 in their hand, or pocket, or attached to a belt, etc. As discussed above in connection with the MFT 130 shown in FIGS. 2-3, the center frequency of the resonance of the MFT 700 shown in FIGS. 7-8 can be advantageously located between two adjacent musical notes on a musical scale. When the MFT 700 is driven with an audio signals, surfaces of the MFT excite corresponding sound waves in the surrounding air.

Figure 9:
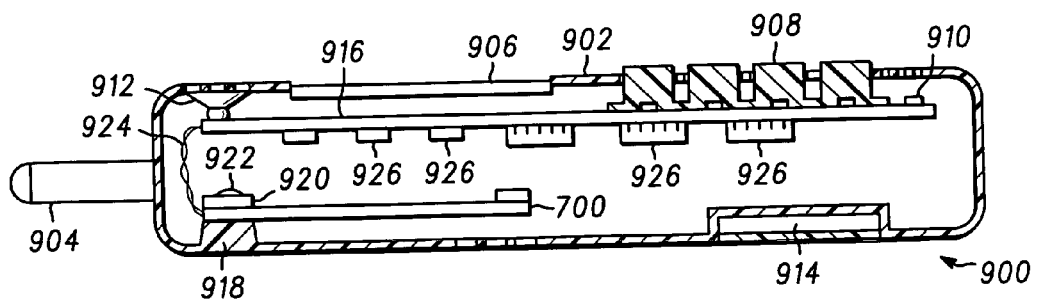
FIG. 9 is a cross sectional side view of a cellular telephone including the multi-function transducer shown in FIGS. 7-8.

FIG. 9 is a cross sectional side view of a cellular telephone 900 including the multi-function transducer 700 shown in FIGS. 7-8. The cellular telephone 900 comprises a housing 902 that supports and encloses a number of components including an antenna 904, a display, 906, a keypad 908, a microphone 910, speaker 912, a battery 914, a printed circuit board 916, and the MFT 700. The MFT 700 is secured to a mounting boss 918 by a clamping plate 920, and two screws 922 (one or which in the FIG. 9 cross sectional side view) that pass through the clamping plate 920 and the two through holes 704 near the first end 701 of the MFT 700. A twisted pair of leads 924 connects the circuit board 916 to the electrical contacts 708, 728 of the MFT 700. Alternatively, a different type of electrical connector is used in lieu of the leads 924. A plurality of electrical circuit components 926 are supported and interconnected by the circuit board 926. The electrical circuit components make up circuits of the cellular telephone 900, including circuits for driving the MFT 700.

Figure 10:
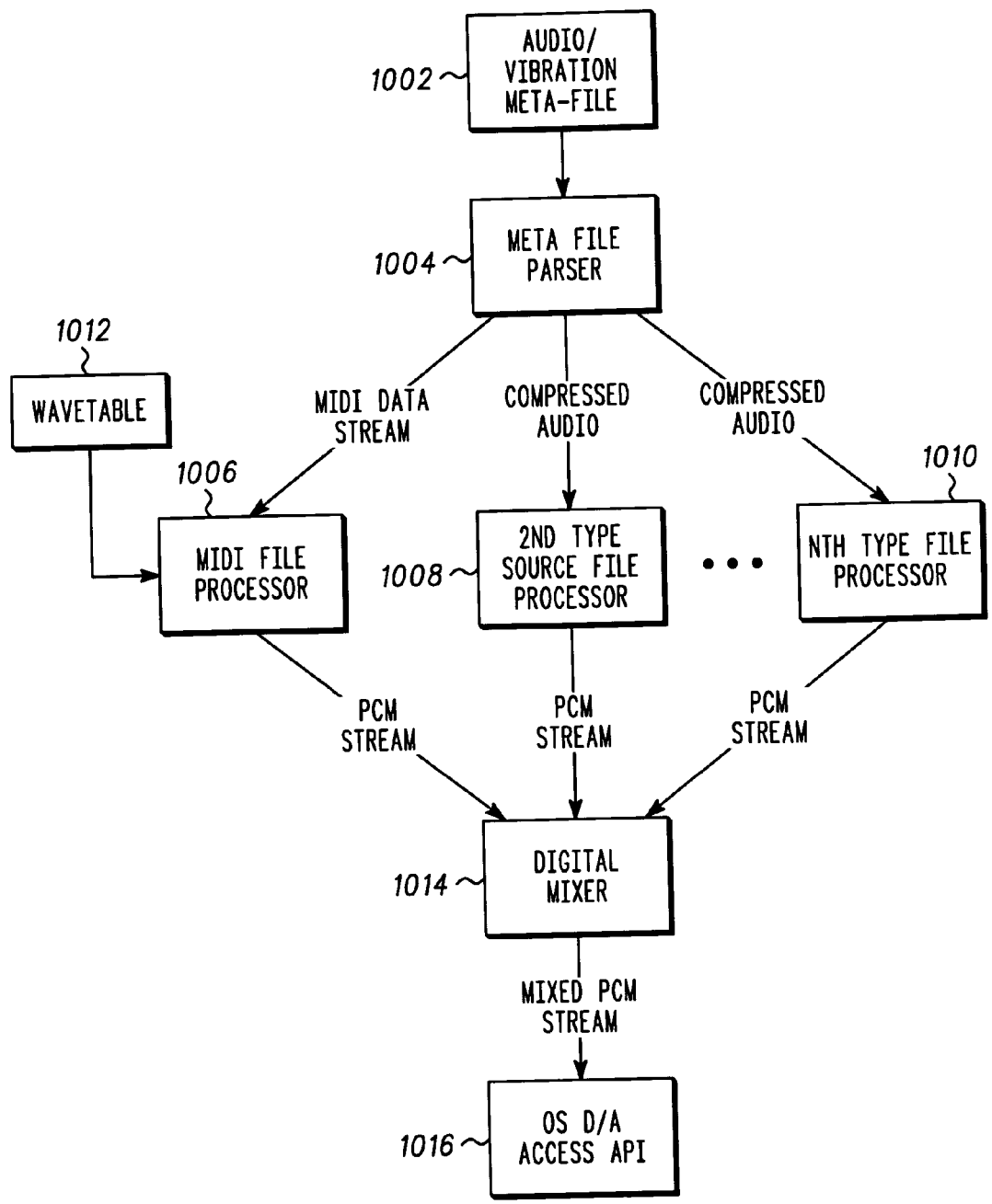
FIG. 10 is a functional block diagram of software used to process data structures including disparate types of digitally encoded signals.

FIG. 10 is a functional block diagram of software used to process data structures including disparate types of digitally encoded signals. Referring to FIG. 10 a meta file 1002 that encapsulates two or more additional data structures, which can be of disparate types, is processed by a meta file parser 1004. The meta file 1002 can comprise an XMF or SMAF file, and correspondingly the meta file parser can comprise an XMF or SMAF file parser. XMF is an open file standard developed and published by the MIDI manufactures association. XMF files are capable of encapsulating MIDI files (also known as SMF files) along with other types of media files such as uncompressed and compressed audio file formats. SMAF is a meta file standard developed by Yamaha corporation. The meta file parser 1004 extracts two or more data structures, each of which digitally encodes drive signals for an (e.g., 130, 700), and supplies each of the two or more data structures to one of a plurality of format specific processors 1006, 1008, 1010. The two or more data structures extracted by the meta file parser 1004 includes a MIDI file, and one or more compressed audio format files. The format specific processors include a MIDI file processor 1006, a $2^{nd}$ type source file processor 1008, and an nth type file processor 1010. By way of nonlimitive example $2^{nd}$ through Nth type source file processors can comprise a .WAV file processor, a .WMA file processor, an AAC file processor or an .MP3 file processor. Any number of file processors can be provided to process a wide range of file formats that could potentially be included in the meta file 1002.

In respect to MIDI files, it is possible to provide MIDI files that are tailored for driving the first resonance of the MFT 130 shown in FIGS. 2-3, and the resonant mode of the MFT 700 shown in FIGS. 7-8, even though such resonance's are located between two musical notes, and MIDI is designed to encode musical notes. In order to tailor MIDI files to drive the resonance's of the MFT's 130, 700 the "Pitch Bend" MIDI command is advantageously used to shift the frequency of musical notes that are adjacent to the resonant frequency to, or near to the resonant frequency. The MIDI "Velocity" command is advantageously used to limit amplitude of MIDI notes used to drive the MFT's 130, 700 so as not to overdrive the MFT's. If General MIDI, which includes a standardized set of instrument sounds is to be used in driving the MFT's 130, 700, it is advantageous to use instrument numbers in the range of 73 to 75, which correspond to flute type instruments, the sound of which is nearly sinusoidal in nature. Referring to FIG. 10, a Wavetable 1012, that stores digitized sound samples that are used by the MIDI file processor 1006 is shown coupled to the MIDI file processor. Alternatively, the Downloadable Sound MIDI standard extension is used to supply a Wavetable sample from which a drive signal for the MFT's 130, 750 is derived. In using the Downloadable sound MIDI standard extension, a sound sample can be received in the META file 1002 by the transceiver module 602. More generally, the meta file 1002 is also received through the transceiver 602, and stored in the workspace memory 610 which may comprises a non-volatile memory such as an Electrically Erasable Read Only Memory (EEPROM) or a flash memory. Alternatively the meta file is stored in the work space memory 610.

The format specific processors 1006-1010 output Pulse Code Modulation (PCM) data streams, to a digital mixer 1014. The digital mixer combines the PCM streams received from the format specific processors into a single mixed PCM stream which is output through an operating system module 1016 to the $1^{st}$ D/A 626.

The first resonance of the MFT 130 shown in FIGS. 2-3, and the resonance of the MFT 700 shown in FIG. 7-8 can be driven using signals derived from MIDI files as discussed above or from compressed audio. Vibration signals used to drive these resonance can be applied simultaneously with audio signals in order to create vibration that can be felt and complementary audio, e.g., music. The combined audio and tactile stimulus creates the illusion that the cellular phone 100, 900 is emitting sound with a strong base component such as is emitted from large speakers, although this is not the case. The perception leads to an enhanced user experience. Signal components used to drive the aforementioned resonance's of the MFT's can be derived from MIDI, or compressed or non compressed audio file formats, and likewise signal components used to generate sound can also be derived from MIDI files, or compressed or non compressed audio file formats.

According to an alternative embodiment of the invention, a single media file encodes a drive signal that includes a first component that includes substantial signal power in a frequency range corresponding to the first resonance of the MFT 130, or the vibration resonance of the MFT 700, and a second signal component including audio. For example, such a single media file can comprise a MIDI file that includes a musical notes forming a melody, and musical notes, modified by pitch bend commands to obtain an output note frequency corresponding to the first resonance of the MFT 130, or the vibration resonance of the MFT 700. As another example such a single media file can comprise a compressed audio format file, that encodes audio, and as well as a drive signal component corresponding in frequency to the first resonance of the MFT 130, and the vibration resonance of the MFT 700. In each case the single media file is decoded to obtain a PCM stream (unless the single media file is a PCM file).

Figure 11:
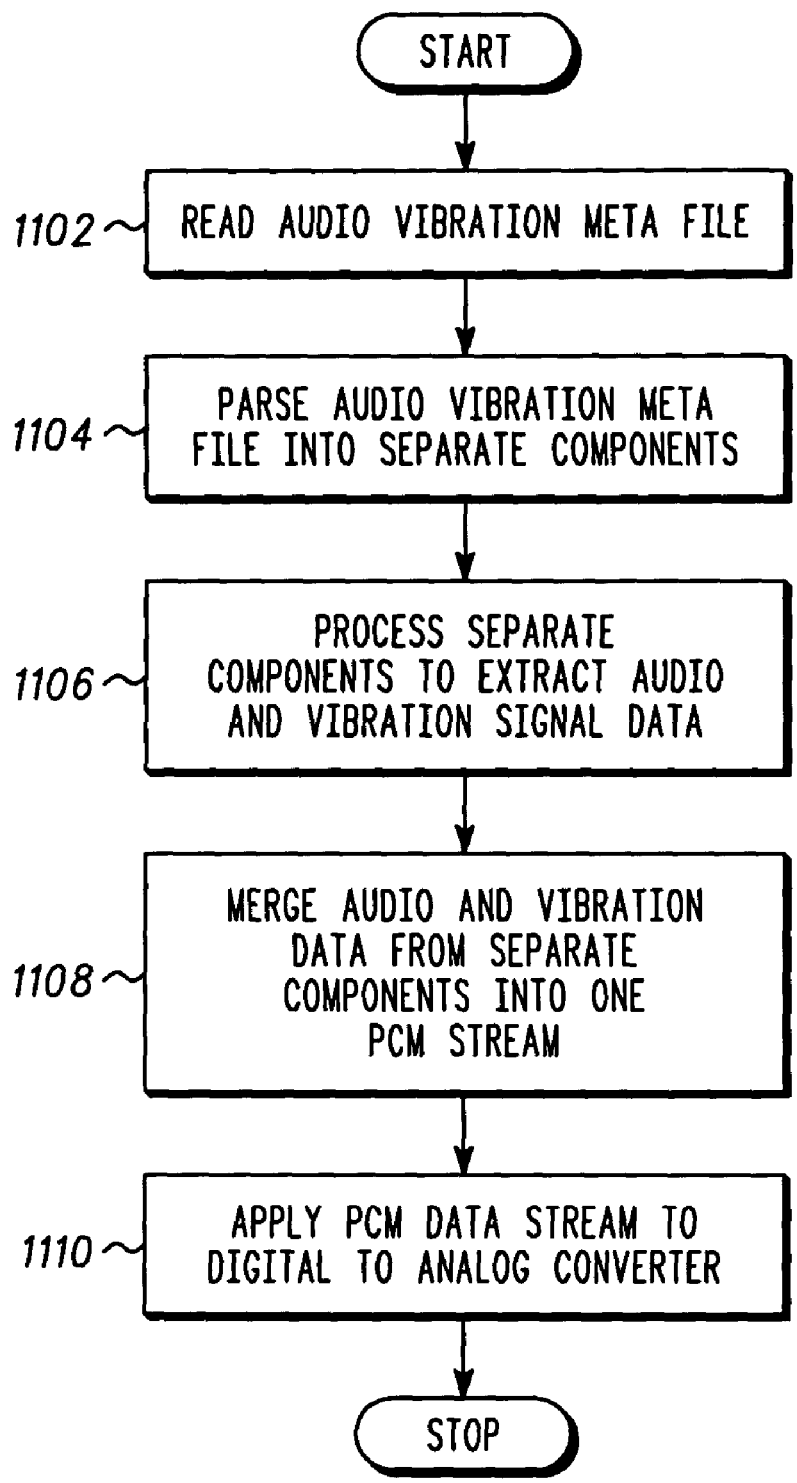
FIG. 11 is a flow chart of a method of processing files that include disparate types of digitally encoded signals and FIG. 12 illustrates the merging of haptic and audio signal components into one signal.

FIG. 11 is a flow chart of a method of processing files that include disparate types of digitally encoded signals. In step 1102 a first data structure in the form of a meta file that includes digitally encoded audio, and vibration signal components is read. In step 1104 the meta file read in step 1102 is parsed to extract two or more additional data structures, which can for example include one or more MIDI files, and one or more compressed or uncompressed audio format files. In step 1106 each of the additional data structures parsed from the first data structure is processed to extract audio and vibration signal component data. In the case that one of the additional data structures includes a compressed audio file, step 1106 comprises decompressing the compressed audio file. In the case that one of the additional data structures includes a MIDI file, step 1106 comprises parsing the MIDI file. In step 1108 audio and vibration data derived in step 1106 from the additional data structures is merged in one PCM data stream. In step 1110 the single PCM data stream formed in step 1108 is applied to a D/A (e.g., $1^{st}$ D/A 616). Thereafter in response to the PCM data stream applied in step 1110 the D/A applies a signal including a first signal component for driving the vibration response of the MFT's 130, 700, and a second signal component that includes audio. In the case that one of the additional data structures extracted in step 1104 is a MIDI file, then a signal component include a sequence of MIDI notes is applied to the MFT 130, 700.

The method shown in FIG. 11 can be carried out in response to receiving an a wireless communication (e.g., incoming call) in order to sound an alert.

Figure 12:
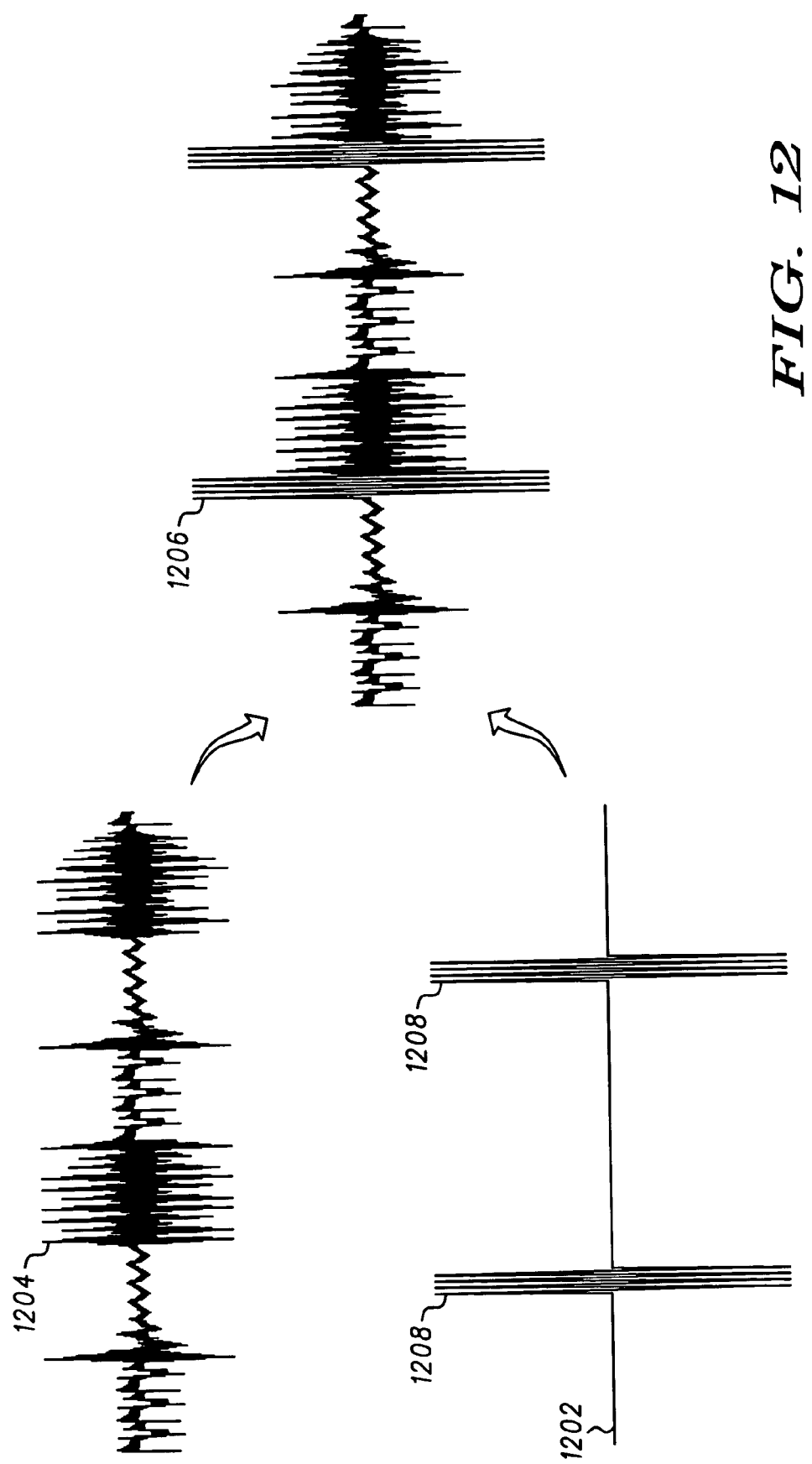

FIG. 12 illustrates the merging of a haptic signal component 1202 and an audio signal component 1204 to form a combined signal 1206. The haptic signal is characterized by one or more frequencies corresponding to the first resonance of the transducer 130, or the resonant frequency of the transducer 700, these frequencies being within the range of tactile perception. The haptic signal component 1204 includes two active periods 1208 that are temporally aligned with relatively low frequency, e.g. bass notes of the audio signal component. Accordingly, the haptic signal component 1202 enhances, and to an extent, serves as a surrogate for low frequency audio components that can not practically be emitted at high power levels from the relatively small, low power transducers that can be accommodated in portable electronic devices. In as much as the first resonance of the transducer 130, is located between musical notes, and characterized by a sufficiently high Q, that its response at the adjacent musical notes is substantially reduced, inadvertent, uncontrolled excitation of the first resonance of the transducer 130 will be substantially reduced.

Although the invention above with reference to cellular telephones shown in FIGS. 1, 6, 9, it is noted that the MFT's 130, 700, the hardware, methods, and software for driving the MFT's can be advantageously incorporated into other handheld devices such as, for example Personal Digital Assistants, portable electronic games.

While specific embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A transducer comprising:
  a mechanical resonator that exhibits a resonance characterized by a quality factor Q and a center frequency $f_0$, wherein the center frequency is located between a first note on a musical scale denoted by $f_1$ and a second note on the musical scale denoted by $f_2$ that is directly adjacent to the first note $f_1$, and $f_0$ and Q have a vibration response of the mechanical resonator at each of the first note $f_1$ and the second note $f_2$ respectively that is at least 6 dB below the maximum vibration response of the mechanical resonator at $f_0$.

2. An apparatus comprising the transducer recited in claim 1 and further comprising:

one or more electrical circuits for applying drive signals to the transducer that include musical melodies, and vibration drive signals for exciting the resonance.

3. The transducer according to claim 1 further comprising:

a piezoelectric transducer motor.

4. The transducer according to claim 1 wherein:

the mechanical resonator comprises:

a beam including a first end adapted for securing to a mounting boss and a second end; and a mass attached to the second end of the beam.

5. The transducer according to claim 4 wherein the beam comprises a piezoelectric material.

6. The transducer according to claim 1 comprising:

a solenoid; and a magnetized ferromagnetic member located proximate the solenoid.

* * * * *